US009277454B2

(12) United States Patent
Liao et al.

(10) Patent No.: US 9,277,454 B2
(45) Date of Patent: Mar. 1, 2016

(54) TRANSMITTING METHOD, RECEIVING METHOD, TRANSMITTER, AND RECEIVER

(71) Applicant: Industrial Technology Research Institute, Hsinchu (TW)

(72) Inventors: Keng-Te Liao, New Taipei (TW); Chia-Han Lee, Taipei (TW); Tzu-Ming Lin, Hsinchu County (TW); Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 213 days.

(21) Appl. No.: 14/071,655

(22) Filed: Nov. 5, 2013

(65) Prior Publication Data

US 2014/0177550 A1    Jun. 26, 2014

Related U.S. Application Data

(60) Provisional application No. 61/739,731, filed on Dec. 20, 2012.

(51) Int. Cl.
| | |
|---|---|
| *H04W 28/18* | (2009.01) |
| *H04W 72/00* | (2009.01) |
| *H04W 74/08* | (2009.01) |

(52) U.S. Cl.
CPC .............. *H04W 28/18* (2013.01); *H04W 72/00* (2013.01); *H04W 74/08* (2013.01)

(58) Field of Classification Search
None
See application file for complete search history.

(56) References Cited

U.S. PATENT DOCUMENTS

| | | | |
|---|---|---|---|
| 8,064,834 B2 | 11/2011 | Kim et al. | |
| 8,140,944 B2 | 3/2012 | Chen et al. | |
| 2008/0101440 A1 | 5/2008 | Lee | |
| 2009/0046629 A1* | 2/2009 | Jiang et al. | 370/328 |
| 2009/0092086 A1 | 4/2009 | Lee et al. | |
| 2009/0175159 A1* | 7/2009 | Bertrand et al. | 370/203 |
| 2009/0227261 A1 | 9/2009 | Tiirola et al. | |
| 2010/0105405 A1* | 4/2010 | Vujcic | 455/452.1 |
| 2011/0110357 A1* | 5/2011 | Chung et al. | 370/344 |
| 2011/0171985 A1* | 7/2011 | Papasakellariou et al. | 455/509 |
| 2011/0244907 A1 | 10/2011 | Golaup et al. | |

(Continued)

OTHER PUBLICATIONS

Kaiser, "OFDM code division multiplexing with unequal error protection and flexible data rate adaptation," IEEE Global Telecommunications Conference, Nov. 25, 2001-Nov. 29, 2001, pp. 861-865, vol. 2.

(Continued)

*Primary Examiner* — Donald Mills
(74) *Attorney, Agent, or Firm* — Jianq Chyun IP Office

(57) ABSTRACT

A transmitter, a receiver, a transmitting method and a receiving method are proposed. the transmitter, adapted for an user equipment (UE) of a data transmission scheme using a contention-based radio access based on single-carrier frequency division multiplexing access with code division multiplexing (SC-FDMA-CDM) includes a memory unit and a processing unit. The memory unit stores a plurality of parameters. The processing unit is coupled to the memory unit, selects one of the parameters and generates a resource pattern by executing a resource pattern generation process according to the selected parameters, wherein the resource pattern includes a physical index of a plurality of resource blocks and a spreading code index. The communication unit is coupled to the processing unit, generates an uplink transmitting signal according to the resource pattern with a plurality of transmitting data bits.

18 Claims, 8 Drawing Sheets

(56) References Cited

U.S. PATENT DOCUMENTS

| | | | |
|---|---|---|---|
| 2011/0249632 A1* | 10/2011 | Eriksson et al. | 370/329 |
| 2011/0263286 A1 | 10/2011 | Damnjanovic et al. | |
| 2011/0292895 A1* | 12/2011 | Wager et al. | 370/329 |
| 2012/0014269 A1 | 1/2012 | Ray et al. | |
| 2012/0106478 A1* | 5/2012 | Han et al. | 370/329 |
| 2012/0120888 A1 | 5/2012 | Miao et al. | |
| 2012/0213196 A1 | 8/2012 | Chung et al. | |
| 2012/0294272 A1* | 11/2012 | Han et al. | 370/329 |
| 2012/0300726 A1* | 11/2012 | Han et al. | 370/329 |

OTHER PUBLICATIONS

Zhou et al., "Contention Based Access for Machine-Type Communications over LTE," IEEE 75th Vehicular Technology Conference (VTC Spring), May 6-9, 2012, pp. 1-5.

Sheu et al., "Efficient data transmission scheme for MTC communication in LTE system," 11th International Conference on ITS Telecommunications (ITST), Aug. 23-25, 2011, pp. 727-731.

Luo and Xiong, "Performance comparison of SC-FDMA-CDMA and OFDM-CDMA systems for uplink," IEEE International Conference on Consumer Electronics, Communications and Networks (CECNet), Apr. 16-18, 2011, pp. 1475-1479.

Lee et al., "A new CDMA-based bandwidth request method for IEEE 802.16 OFDMA/TDD systems," IEEE Communications Letters, Feb. 2010, pp. 124-126, vol. 14, No. 2.

Taleb and Kunz, "Machine type communications in 3GPP networks: potential, challenges and solutions," IEEE Communications Magazine, Mar. 2012, pp. 178-184.

Office Action of Taiwan Counterpart Application, issued on Apr. 17, 2015, p. 1-p. 4.

* cited by examiner

TRANSMITTING METHOD, RECEIVING METHOD, TRANSMITTER, AND RECEIVER

CROSS REFERENCE TO RELATED APPLICATION

This application claims the priority benefit of U.S. provisional application Ser. No. 61/739,731, filed on Dec. 20, 2012. The entirety of the above-mentioned patent application is hereby incorporated by reference herein and made a part of specification.

TECHNICAL FIELD

The present disclosure generally relates to a transmitting method, a receiving method, a transmitter using the same method, and a receiver using the same method.

RELATED ART

In conventional arts, a signaling procedure would be required before a user equipment (UE) may access a network. A normal UE could typically access a network through a base station or an evolved Node B (eNB) by utilizing regularly scheduled resources or by performing a radio access procedure. For a machine type communication (MTC) UE however, presently a MTC UE would normally access a network through a radio access procedure since most MTC UEs would access a network irregularly and transmits a small quantity of data. Considering a typical radio access signaling scheme, the radio access signalling scheme may include four phases—radio access request, radio access response, network contention, and contention resolution which are known as Msg1~Msg4 respectively.

More specifically, a UE may first transmit a Msg1 which includes a radio access preamble to an eNB to request for a radio access. In response to transmitting the random access preamble, the UE may receive back from the eNB a Msg2 which includes random access response which could notify the UE the result of the random access request and would achieve synchronization between the UE and the eNB. In response to receiving the Msg2, the UE would then transmit a Msg3 which includes a request for transmission resources. In response to transmitting Msg3, the UE may receive a Msg4 through resources to transmit buffer status reports and to begin uplink and downlink operations with the eNB.

For MTC applications involving small data transmissions such as smart metering MTC communication, the characteristics for such application would be that even though the sheer quantity of MTC UEs could be extremely large, only a small amount of data would actually be transmitted. If the aforementioned random access procedure were to be applied for these particular characteristics of MTC application, the radio access procedure would then seem quite impractical. Consequently, a transmission scheme using a contention-based radio access based on code division multiplexing (CDM) has been proposed. However, currently no specific transceiver design based on contention-based radio access using CDM has been known, and the high computation complexity of the transceiver could be also predicted.

In the transmission scheme using contention-based radio access based on CDM, the resources would be twice of a non-CDM transmission scheme. A UE could not only select resource blocks randomly but also selects spreading codes of CDM randomly. When an eNB receives transmission data from a UE, the eNB may need to try all combinations of resource blocks and spreading codes without the guidance of any control signaling and thus high computational complexity would be introduced. As a result, the receiver of the transmission scheme could be too complex or too computationally intensive to implement.

SUMMARY OF THE DISCLOSURE

Accordingly, the present disclosure is directed to a transmitter and a transmission method thereof of the transmission scheme using contention-based radio access based on CDM, jointly select the resource blocks and the spreading code and generate the uplink transmitting signal according to the selected resource blocks and the selected spreading code, so that a collision probability can be reduced, and the computational complexity of a corresponding receiver can be reduced thereby.

The transmitter includes at least but not limited to a memory unit and a processing unit. The memory unit stores a plurality of parameters. The processing unit is coupled to the memory unit and selects one of the parameters and generates a resource pattern by executing a resource pattern generation process according to the selected parameters, wherein the resource pattern includes a physical index of a plurality of resource blocks and a spreading code index. The communication unit is coupled to the processing unit and generates a uplink transmitting signal according to the resource pattern with a plurality of transmitting data bits.

The transmitting method includes at least but not limited to selecting one of a plurality of parameters and generating a resource pattern by executing a resource pattern generation process according to the selected parameters, wherein the resource pattern includes a physical index of a plurality of resource blocks and a spreading code index, and generating a uplink transmitting signal according to the resource pattern with a plurality of transmitting data bits.

The present disclosure is directed to a receiver and a receiving method thereof of the transmission scheme using contention-based radio access based on CDM, with lower complexity design that are practical to be implemented.

The receiver includes at least but not limited to a communication unit and a processing unit. The communication unit receives a transmitting signal and detecting a reference signal in the transmitting signal. The processing unit is coupled to the communication unit and derives a resource pattern by executing a resource pattern recognition process according to the transmitting signal and the reference signal, wherein the resource pattern comprising a physical index of a plurality of resource blocks and a spreading code index. And the communication unit receives the resource pattern from the processing unit, the communication unit further receives the transmitting signal by a code division multiplexing physical uplink channel (CDM-PUCH) receiving process according to the resource pattern to transfer the transmitting signal into a plurality of transmitting data bits.

The receiving method includes at least but not limited to receiving a transmitting signal, detecting a reference signal in the transmitting signal, deriving a resource pattern by executing a resource pattern recognition process according to the transmitting signal and the reference signal, wherein the resource pattern comprising a physical index of a plurality of resource blocks and a spreading code index, and receiving the transmitting signal by a code division multiplexing physical uplink shared channel (CDM-PUCH) receiving process according to the resource pattern.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE DISCLOSURE

Figure 1A:
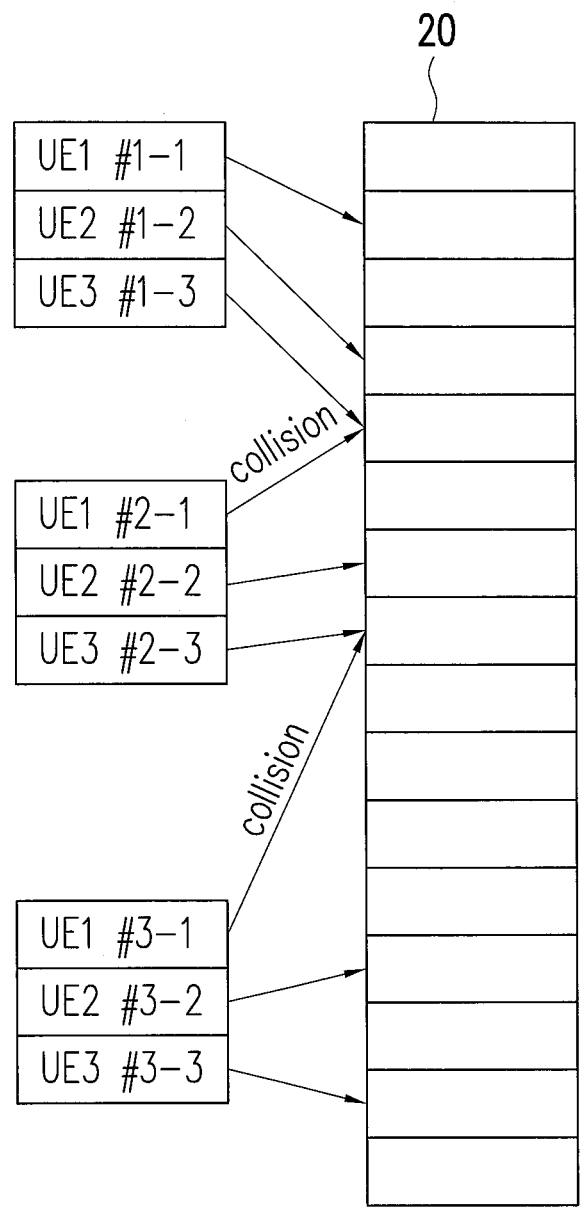
FIG. 1A illustrates a conventional contention-based radio access scheme.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
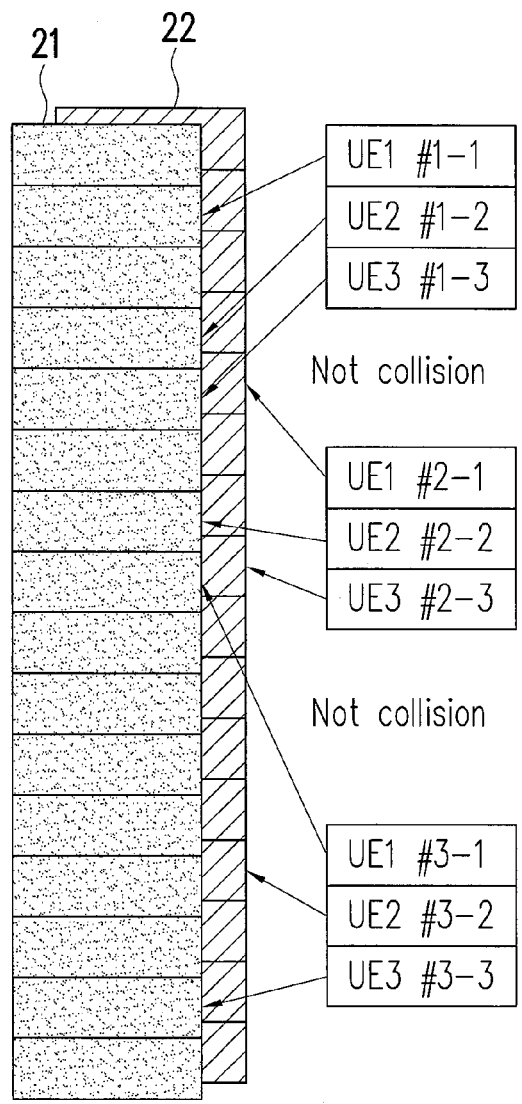
FIG. 1B illustrates a contention-based radio access scheme based on CDM.

Differences between a conventional contention-based radio access scheme and a contention-based radio access scheme based on code division multiplexing (CDM) would be elucidated by a comparison between FIG. 1A and FIG. 1B. FIG. 1A illustrates a result of using a conventional contention-based radio access scheme whereas FIG. 1B illustrates a result of using a contention-based radio access scheme based on CDM.

Assuming that there are three UEs 1~3 in the exemplary scenario of FIG. 1A with each of which attempting to attach to a network by accessing three resource blocks (RBs) at a time using a radio access scheme. Subsequently, the UEs 1~3 may randomly select three RBs out of all RBs of a first resource pool 20 respectively. However, when two of the UEs 1~3 randomly selects the same RB, a collision may occur. As shown in FIG. 1A, the first data block and the third data block of UE2 are collided with the third data block of UE1 and the first data block of UE3 respectively. Therefore, in conventional arts, a contention based signaling procedure would be executed before the UEs accessing the network through a control node in order to prevent collisions as described above.

On the other hand, for the example illustrated by FIG. 1B, the UEs not only could randomly select and access RBs but also could randomly select a spreading code before accessing the RBs. The spreading codes could be configured to be orthogonal relative to one another. For example, as shown in FIG. 1B, resource pools 21 and 22 are the same resource pools with different spreading codes. As a result of random selections of an orthogonal spreading code, the collision probability between two UEs accessing the same RB could be reduced as the RB pool becomes larger. For small data transmission such as smart metering in MTC communication, the concept of contention-based radio access scheme based on CDM could effectively reduce the signaling overheads as well as transmission latency problems since the signaling procedure would no longer be needed in the contention-based radio access scheme based on CDM. However, new challenges may be introduced when choosing a contention-based radio access scheme based on CDM. Since the RBs accessed by the UEs and the spreading codes are chosen randomly, receivers of eNBs may need to exhaustively search for all combinations of RBs and spreading codes in order to receive the data from the UEs successfully. Such wide search range may cause very high calculation complexity and would consequently be too difficult or expensive to be practical.

Figure 2:
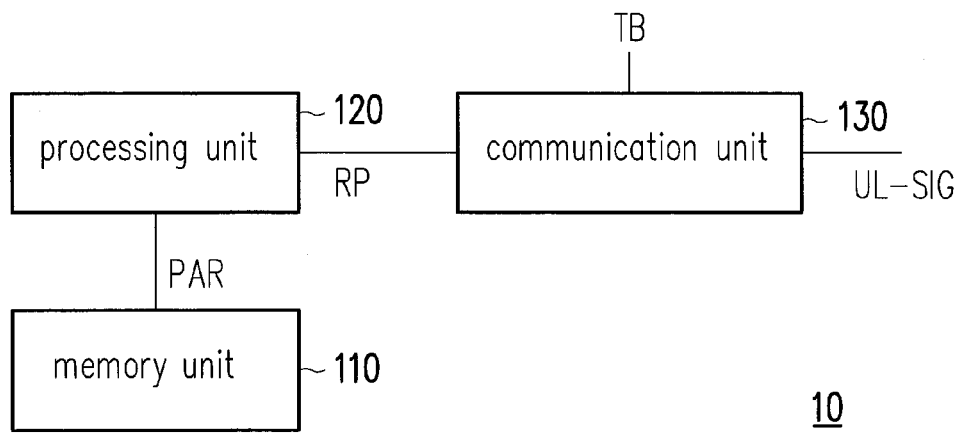
FIG. 2 illustrates a functional block diagram of a transmitter according to an embodiment of the present disclosure.

In the present disclosure, a transmitter and a receiver would be proposed to solve the problem related to the high complexity as described previously. FIG. 2 illustrates a functional block diagram of a transmitter according to an exemplary embodiment of the present disclosure. The transmitter of FIG. 2 could be used by a UE of a data transmission scheme using a contention-based radio access based on single-carrier frequency division multiplexing access with code division multiplexing (SC-FDMA-CDM).

The term "user equipment" (UE) or "MTC UE" or "MTC device" in this disclosure represents embodiments that may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so like. A UE or MTC UE or MTC device could be referred to any of the aforementioned embodiments which does not necessarily need human interactions.

Referring to FIG. 2, the transmitter 10 may include at least but not limited to a memory unit 110, a processing unit 120 and a communication unit 130. The memory unit 110 would store a plurality of parameters PAR, such as a plurality of natural numbers, or a user identity (e.g., a user ID). The processing unit 120 could be coupled to the memory unit 110 and may select one of the parameters PAR and generate a resource pattern RP by executing a resource pattern generation process according to the selected parameters PAR. In the present embodiment, the resource pattern may include a physical index of a plurality of RBs and a spreading code index. The communication unit 130 could be coupled to the processing unit 120 and would generate an uplink transmitting signal UL-SIG according to the resource pattern with a plurality of transmitting data bits.

Figure 3:
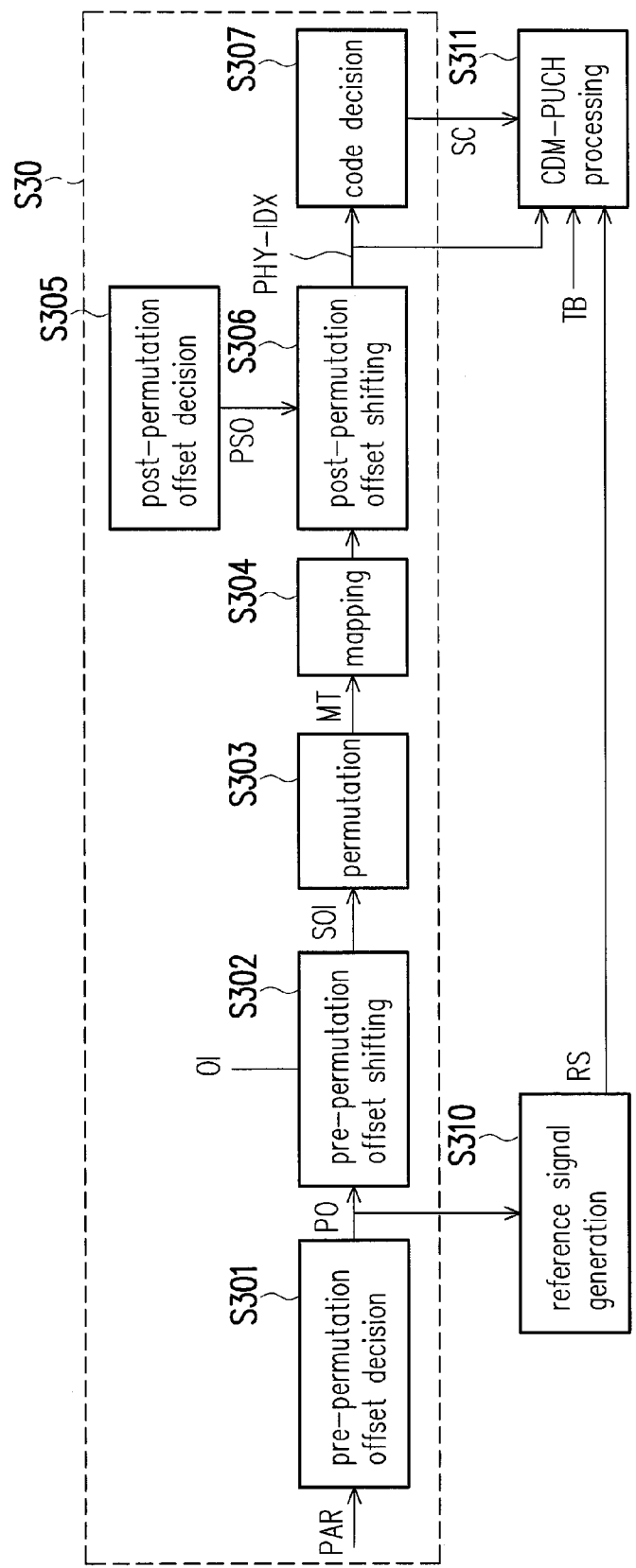
FIG. 3 illustrates the process flow of a resource pattern generation and a reference signal generation.

The resource pattern generation process would be shown in FIG. 3 which illustrates the process of a resource pattern generation and a reference signal generation. Referring to FIGS. 2 and 3 together, the resource pattern generation process S30 may include a pre-permutation offset decision step S301, a pre-permutation offset shifting step S302, a permutation step S303, a mapping step S304, a post-permutation offset decision step S305, a post-permutation offset shifting step S306, and a code decision step S307.

First of all, at the pre-permutation offset decision step S301, a pre-offset PO would be selected from the parameters PAR which could be stored in the memory unit 110. The selection could be a naturally selected random number from the parameters PAR or could be based on a natural number according to the user ID of the UE or other parameters associated with certain mathematical functions as the present disclosure is not limited thereto. The selection could be performed by a processor or a processing unit 120 of FIG. 2. At the pre-permutation offset shifting step S302, an ordered index OI could be cyclically shifted according to the pre-offset PO. Herein, the ordered index OI could be a sequence of continuous number in an ascending order or in a descending order. In the present embodiment, the ordered index OI is a sequence of number in ascending order which starts from 1.

Next, at the permutation step S303, the shifted ordered index SOI is permutated into a mapping table MT. In the present embodiment, an interleaving function is used to permutate the shifted ordered index SOI. However, other permutation functions could be used herein, the disclosure is not limited thereto.

At the mapping step S304, a virtual index would be mapped onto the mapping table MT to generate the physical index of the resource blocks. Herein, the virtual index is a continuous sequence of number starting from 1 or 0, and the virtual index would correspond to a sequence of data that to be transmitted (e.g., the transmitting data bits allocated to different resource blocks) to the control node through the RBs. And the physical index would correspond to the index of RBs to be accessed by the UE.

At the post-permutation offset decision in step S305, a post-offset PSO would be selected from the parameters which could be stored in the memory unit 110. Similar to the step S301, a natural number from the parameters could be randomly selected or could be selected according to the user identities of the UE or other parameters with certain mathematical functions as the disclosure is not limited thereto. At the post-permutation offset shifting step S306, a position of the virtual index would be cyclically shifted onto the mapping table MT according to the post-offset PSO to generate the physical index PHY-IDX. At the code decision step S307, the spreading code index SC would be generated according to the physical index PHY-IDX of the RBs. In an embodiment of the present disclosure, the spreading code index SC could be generated according to the pre-offset PO and a spreading factor L (not shown).

Also, it could be necessary to provide the pre-offset PO to a receiving end (e.g. a receiver of a base station) so that the mapping table MT could be re-build, and the transmitting data could be successfully received by the receiving end. Therefore, in the present embodiment, the information of pre-offset PO could be further included when generating a reference signal RS (step S310).

It is noted that under some practical considerations, the steps S301~S302 could be omitted because of computational complexity. Therefore, by this consideration, the reference signal RS won't include any information related to the pre-offset PO. Also, for the use of the transmission scheme such as Long Term Evolution (LTE) or LTE related communication systems, the reference signal RS mentioned above could also be implemented as a pilot signal. An exemplary example of all the steps S301~S307 of the resource pattern generation process S30 as well as the step S310 and process S311 would be provided later in the present disclosure. Also all processes of the resource pattern generation process S30 could be implemented by the processing unit 120 of FIG. 2.

After the generation of the resource pattern RP (i.e., the physical blocks PHY-IDX of the RBs and the spreading code index SC) and the reference signal RS, a code division multiplexing physical uplink channel (CDM-PUCH) processing could be executed according to the resource pattern RP with the transmitting data bits by the communication unit 130 to generate the uplink transmitting signal UL-SIG.

Figure 4:
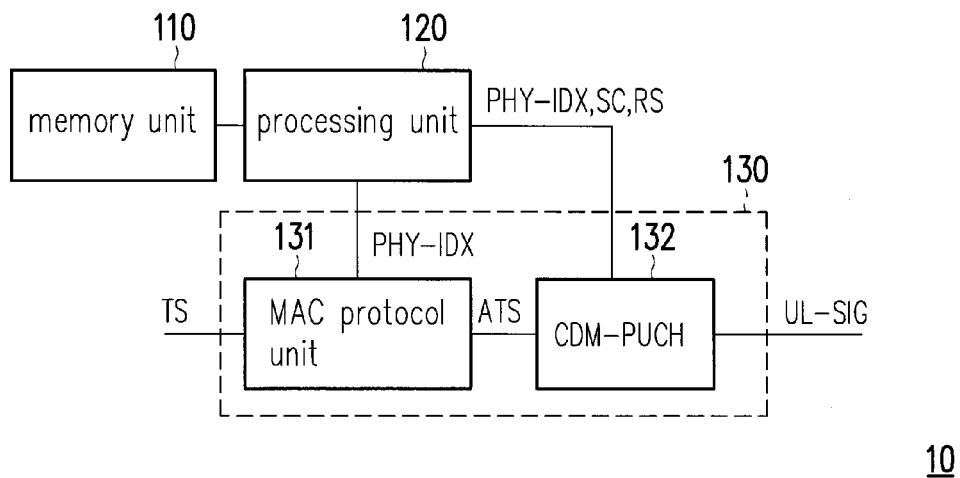
FIG. 4 illustrates a functional block diagram of a transmitter according to an embodiment of the present disclosure.

FIG. 4 illustrates a functional block diagram of a transmitter according to an embodiment of the present disclosure. In comparison to the embodiment of FIG. 2, the embodiment of FIG. 4 would include more implementation details of the communication unit 130 of FIG. 2. Referring to FIG. 4, the communication unit 130 may further include a media access control (MAC) protocol unit 131, and a code division multiplexing physical uplink channel (CDM-PUCH) 132.

The MAC protocol unit 131 would be coupled to the processing unit 120 and would allocate the transmitting data bits TS according to the physical index PHY-IDX of the RBs. The CDM-PUCH 132 would be coupled to the MAC protocol unit 131 and would receive the allocated transmitting data bits ATS from the MAC protocol unit 131 and generate the uplink transmitting signal UL-SIG according to the physical index PHY-IDX of the RBs, the spreading code index SC and the allocated transmitting data bits ATS, and also would append the reference signal RS in the uplink transmitting signal UL-SIG.

Figure 5:
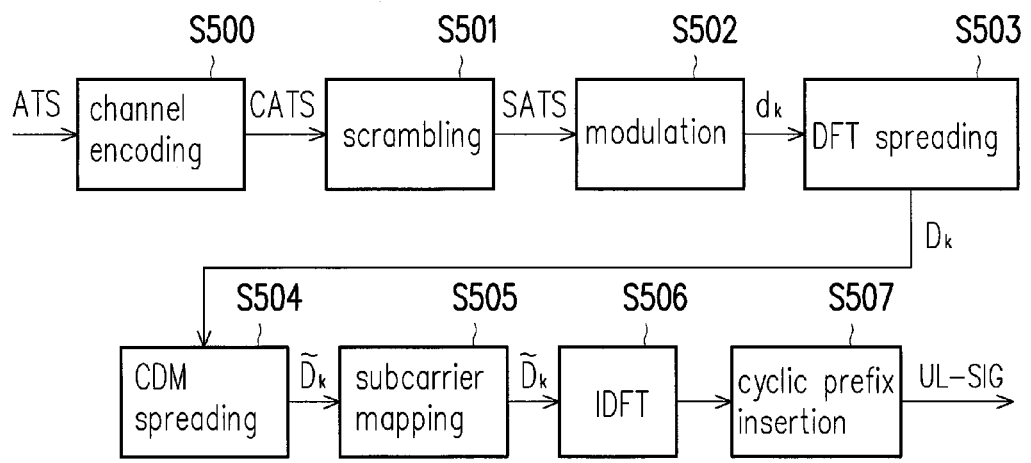
FIG. 5 illustrates the processing steps of the CDM-PUCH processing according to an embodiment of the present disclosure.

In an exemplary embodiment of the present disclosure, in CDM-PUCH 132, the communication unit 130 would generate an uplink transmitting signal UL-SIG by executing a CDM-PUCH processing which corresponds to the process S311 as illustrated in FIG. 3. FIG. 5 illustrates the processes steps of the CDM-PUCH processing according to an exemplary embodiment of the present disclosure. Referring to FIG. 5, the CDM-PUCH processing would include a channel encoding process S500, a scrambling step S501, a modulation step S502, a discrete Fourier transform (DFT) spreading step S503, a CDM spreading step S504, a sub-carrier mapping step S505, an inverse discrete Fourier transform step S506, and a cyclic prefix insertion step S507.

At the channel encoding step S500, the communication unit 130 encodes the allocated transmitting data bits ATS into coded allocated transmitting data bits CATS. At the scrambling step S501, the communication unit 130 scrambles the coded allocated transmitting data bits CATS into a plurality of scramble transmitting data bits SATS. At the modulation step S502, the communication unit 130 would modulate the scrambling transmitting data bits SATS into a plurality of modulated complex symbols denoted as $d_k$, wherein the coefficient k corresponds to the physical index PHY-IDX.

At the DFT spreading step S503, the communication unit 130 transforms and spreading the modulated complex symbols to frequency domain with a discrete Fourier transformation to generate a plurality of DFT outputs, denoted as $D_k$. In the present exemplary embodiment, an N-point DFT can be performed on the modulated complex symbols $d_k$, and can be presented as:

$$D_k[m] = \frac{1}{\sqrt{N}} \sum_{n=0}^{N-1} d_k[n] \cdot e^{-j\frac{2\pi m}{N}} \quad (1)$$

At the CDM spreading step S504, a plurality of spreading outputs would be generated by spreading the subcarrier-mapped DFT output $D_k$ according to the spreading code index SC. In an embodiment of the present disclosure, the CDM spreading could be realized by Hadamard transform, which has the limitation that the spreading factor L can only be a power of 2. By taking flexibility into consideration, an orthogonal sequence could be used as the spreading code index instead of the Hadamard sequence. The orthogonal sequence $C_L$ can be defined as:

$$C_L = [c_0 \; c_1 \; \ldots \; c_{L-1}]^T, l = 0, \ldots, L-1 \quad (2)$$

where $$c_l = \left[ e^{j\frac{2\pi \cdot 0 \cdot l}{L}} \; e^{j\frac{2\pi \cdot 1 \cdot l}{L}} \; \ldots \; e^{j\frac{2\pi \cdot L-1 \cdot l}{L}} \right]$$

And from (1) and (2), the spreading output $\tilde{D}_k$ can be presented as the Kronecker product of $D_k$ and $c_k$:

$$\tilde{D}_k = D_k \otimes c_k \quad (3)$$

And at the sub-carrier mapping step S505, the communication unit 130 would map the CDM spreading output $\tilde{D}_k$ with a plurality of sub-carriers.

At the IDFT step S506, the communication unit 130 may transform the subcarrier-mapped CDM spreading output $\tilde{D}_k$ with an inverse discrete Fourier transformation to generate the uplink transmitting signal UL-SIG, and as an inverse operation of DFT, in the present embodiment, an N-point IDFT is performed.

In addition, at the cyclic prefix insertion step S507, the communication unit 130 may replicate the last samples of IDFT output symbols (i.e., the last symbols of the uplink transmitting signal UL-SIG) to generate a cyclic prefix and would insert (or append) the cyclic prefix at the front of the uplink transmitting signal UL-SIG.

In the present disclosure, a receiver adapted for a control node of a data transmission scheme using a contention-based radio access based on SC-FDMA-CDM, which corresponds to the transmitter described above, would also be provided.

A control node in this disclosure would be referred to as a base station (BS) or an eNB. It should be noted that the references of such are merely exemplary and therefore do not serve as limitations to the type of control nodes as it would be apparent to those skilled in the art that other types of control node could be selected to achieve network control purposes such as an advanced base station (ABS), a base transceiver system (BTS), an access point, a home base station, a relay station, a repeater, an intermediate node, an intermediary, and/or satellite-based communication base stations.

The control node may also be referred to entities such as a Mobility Management Entity (MME), a Serving Gateway (S-GW), a Packet Data Network Gateway (PDN-GW), a Serving GPRS Support Node (SGSN), a Gateway GPRS Support Node (GGSN), a Mobile Switching Center (MSC), and a Home Subscriber Server (HSS) or a node maintaining a database related to subscriber information.

Figure 6:
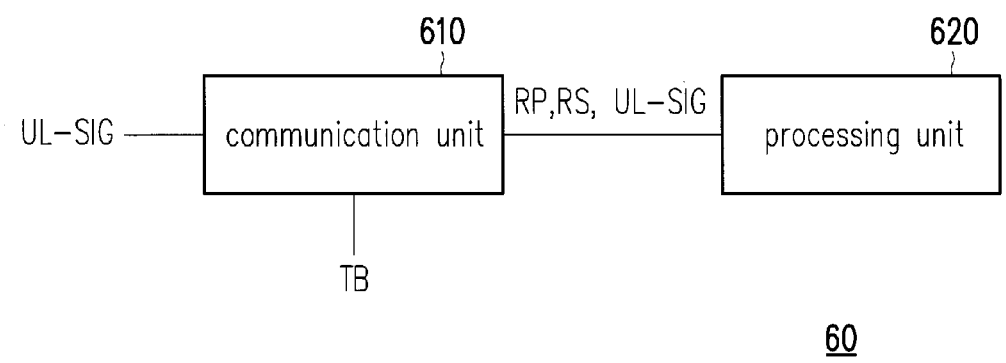
FIG. 6 illustrates a functional block diagram of a receiver according to an embodiment of the present disclosure.

FIG. 6 illustrates a functional block diagram of a receiver according to an embodiment of the present disclosure. Referring to FIG. 6, the receiver 60 may include a communication unit 610 and a processing unit 620. The communication unit 610 would receive an uplink transmitting signal UL-SIG and would detect a reference signal RS in the uplink transmitting signal UL-SIG. The processing unit 620 would be coupled to the communication unit 610 and would derive a resource pattern RP by executing a resource pattern recognition process according to the uplink transmitting signal UL-SIG and the reference signal RS, wherein the resource pattern RP would include a physical index PHY-IDX of a plurality of resource blocks and a spreading code index SC. The communication unit 610 may then receive the resource pattern RP from the processing unit 620 and may further receive the uplink transmitting signal UL-SIG by a code division multiplexing physical uplink channel (CDM-PUCH) receiving process according to the resource pattern RP to transfer the uplink transmitting signal UL-SIG into a plurality of transmitting data bits TB. It is noted that in the present embodiment, the communication unit 610 could merely transfer the uplink transmitting signal UL-SIG into the transmitting data bits TB according to the resource pattern RP derived by a resource pattern recognition process and a code division multiplexing scheme without any additional information.

Figure 7:
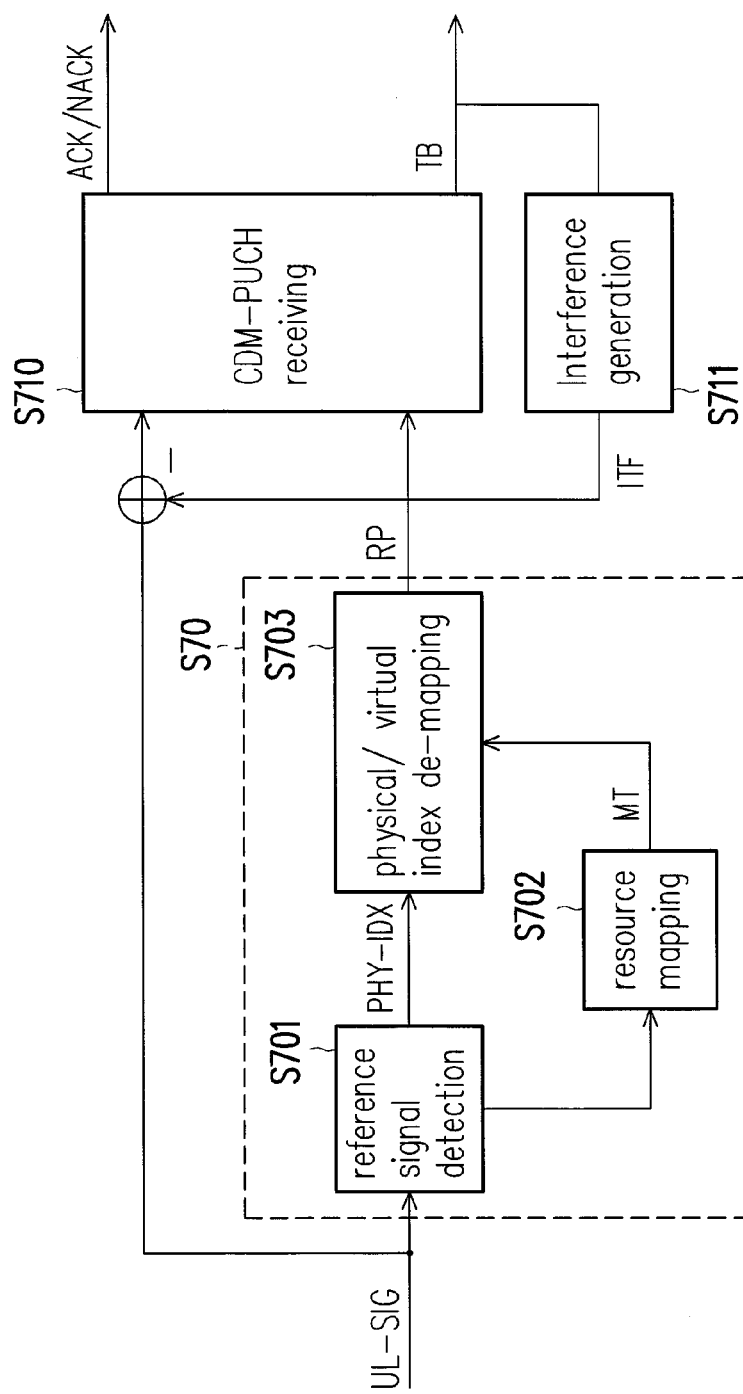
FIG. 7 illustrates a process flow of a resource block recognition process and a CDM-PUCH receiving process according to an embodiment of the present disclosure.

FIG. 7 illustrates a process flow of a resource block recognition process and a CDM-PUCH receiving process according to an embodiment of the present disclosure. Referring to FIGS. 6 and 7 together, the resource block recognition process S70 may include a reference signal detection step S701, a resource mapping step S702 and a physical/virtual index de-mapping step S703. First, at the reference signal detection step S701, the processing unit 620 may extract a pre-offset PO from the reference signal RS and may determine a physical index PHY-IDX, which is used for data transmission. And at the resource mapping step S702, the processing unit 620 would generate a mapping table MT according to the pre-offset PO and the physical index PHY-IDX.

Herein, the receiver 60 would know the permutation function used by the transmitter before transmission is assumed so that the processing unit 620 can re-build (generate) the mapping table MT to be the same as the mapping table MT in the transmitter (e.g., transmitter 10 in FIG. 2) after receiving the pre-offset PO. Although the physical index PHY-IDX of the RBs would be known when receiving the uplink transmitting signal UL-SIG, but the sorting sequence of the physical index PHY-IDX, i.e. the virtual index of the RBs would still be unknown. Therefore, at the physical/virtual index de-mapping step S703, the processing unit 620 would de-map the physical index PHY-IDX into a virtual index according to the mapping table MT and would determines the resource pattern RP according to the mapping table MT and the virtual index. The processing unit 620 may place the physical index PHY-IDX in order and shift the ordered physical index PHY-IDX to match the elements on the mapping table MT in order to derive the relationship between the physical index PHY-IDX and the virtual index of RBs.

Once the processing unit 620 would derive the physical index PHY-IDX and the virtual index, the processing unit 620 could also determine the spreading code index SC according to the physical index PHY-IDX. Consequently, after the de-mapping process S703, the processing unit 620 would transmit the legal combination of physical index PHY-IDX and the spreading code index SC, i.e. the resource pattern RP to the communication unit 610 so that the communication unit 610 may receive the uplink transmitting signal UL-SIG by a CDM-PUCH receiving process according to the resource pattern RP to transfer the uplink transmitting signal UL-SIG into a plurality of transmitting data bits TB (process S710). Also, in the present embodiment, the communication unit 620 may also check the transmitting data bits TB with a sequence of CRC code, where the CRC code may be added in the UL-SCH 132 of communication unit 130 of transmitter 10 (as shown in FIG. 4). If the transmitting data bits TB would be found to be correct, the communication unit 610 may transmits a acknowledge (ACK) signal to the transmitter (e.g., transmitter 10 in FIG. 2) to notify that the transmission has been successful. On the other hand, if there were errors in the transmitting data bits TB, the communication unit 610 may transmit a negative acknowledge (NACK) signal to the transmitter to notify that the transmission has failed so that the transmitter (e.g., transmitter 10 in FIG. 2) could resend the previously transmitted transmitting data bits TB before sending the new ones.

Furthermore, in the present embodiment, the communication unit 620 collects the decoded transmitting data bits TB, and executes an interference generation process (process S711) according to the decoded transmitting data bits TB to generate the interference signal ITF. The interference signal ITF would correspond to interferences that may be produced by other UEs (e.g., MTC UEs that correspond to the same receiver 60). The interference signal ITF would be removed from the received uplink transmitting signal UL-SIG, so that a decoding performance of CDM-PUCH receiving process (process S710) can be improved thereby. Examples from the transmitter to the receiver will be shown hereinafter, and will be explained with the reference of the previous figures and other schematic diagrams. The first example would illustrate how a transmitter would generate the resource pattern RP. Referring to FIGS. 2 and 3 together, assuming that the length of the ordered index OI is 15 and the ordered index OI is a sequence of continuous number starts from 1, the ordered index OI could be expressed as:

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|

And assuming that the pre-offset PO selected by the processing unit 120 is 1, after step S302, the shifted ordered index SOI could be expressed as:

| 15 | 1 | 2 | 3 | 4 | 5 | 6 | 7 | 8 | 9 | 10 | 11 | 12 | 13 | 14 |
|----|---|---|---|---|---|---|---|---|---|----|----|----|----|----|

In the example, the processing unit 120 may use an interleaving function to permute the shifted ordered index SOI at step S303, and the interleaving function would be implemented as follows: First, the processing unit 120 would write in the shifted ordered index SOI in a 3*5 buffer by row:

| 15 | 1  | 2  | 3  | 4  |
|----|----|----|----|----|
| 5  | 6  | 7  | 8  | 9  |
| 10 | 11 | 12 | 13 | 14 |

And then the processing unit 120 may read out the index by column to obtain the mapping table MT, so that the mapping table MT could be expressed as:

| 15 | 5 | 10 | 1 | 6 | 11 | 2 | 7 | 12 | 3 | 8 | 13 | 4 | 9 | 14 |
|----|---|----|---|---|----|---|---|----|---|---|----|---|---|----|

Other interleaving function could also be applied such as using a buffer size different from the length of the index and adding zero at the blank buffer and ignoring the zeros while reading out; or cyclic shifting the rows of buffer before reading out the index . . . etc., the disclosure is not limited thereto.

Next, steps S305 and S306 would be executed. Assuming that there are 6 RBs used by a UE during transmission so that the length of the virtual index is 6. When setting the post-offset PSO as 1, the virtual index could be express as:

| 1 | 2 | 3 | 4 | 5 | 6 |
|---|---|---|---|---|---|

Assuming that the post-offset PSO selected by the processing unit 120 would be 4, the virtual index could be expressed as:

| 4 | 5 | 6 | 7 | 8 | 9 |
|---|---|---|---|---|---|

And by mapping the virtual index to the corresponding position of mapping table MT, (or in other words, shifting the position of virtual index according to the post-offset PSO), the physical index PHY-IDX could be derived thereby and expressed as:

| 1 | 6 | 11 | 2 | 7 | 12 |
|---|---|----|---|---|----|

At step S307, there could be several ways to generate the spreading code index SC according to the physical index PHY-IDX and other parameters such as pre-offset PO and the spreading factor L. In this example, the processing unit 120 may generate the spreading code index SC by a modulo function (mod), and the spreading code index could be expressed as:

$$\text{spreading code index} = \text{mod}(\text{physical index} + \text{RB order}, L) + 1 \qquad (4)$$

, wherein RB order equals to:

| 1 | 2 | 3 | 4 | 5 | 6 |
|---|---|---|---|---|---|

By setting the spreading factor as 3, the spreading code index SC could be expressed as:

| 3 | 3 | 3 | 1 | 1 | 1 |
|---|---|---|---|---|---|

Or, the following equation based on a random code shift could be used to generate the spreading code index SC:

$$\text{spreading code index} = \text{mod}(\text{physical index} + \text{random code shift}, L) + 1 \qquad (5)$$

, by setting the random code shift as 1, the spreading code index SC could be express as:

| 3 | 2 | 1 | 1 | 3 | 2 |
|---|---|---|---|---|---|

As a result, the resource pattern RP including the physical index of RB and the spreading code index SC would be generated so that the communication unit 130 may process the transmitting data bits TB into the uplink transmitting signal UL-SIG with the resource pattern RP.

Figure 8A:
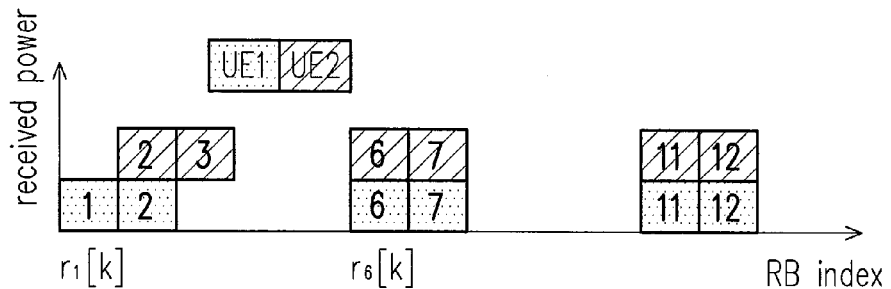
FIG. 8A illustrates a schematic diagram of transmitters of two UEs choose the same pre-offset and occupy different resources.

The second example illustrates how the receiver would receive the uplink transmitting signal UL-SIG. Referring to FIGS. 6 and 7 together, the first step of receiver processing would be to detect the reference signal RS to indicate which pre-offset would be used and whether each of the RBs would be used for data transmission. FIG. 8A illustrates a schematic diagram of transmitters of two UEs choose the same pre-offset PO and occupy different RBs. By choosing the same pre-offset PO, it would mean that the transmitters of the UEs would generate the same mapping table MT. Here in the example, the mapping table MT described in the previous example is assumed.

Figure 8B:
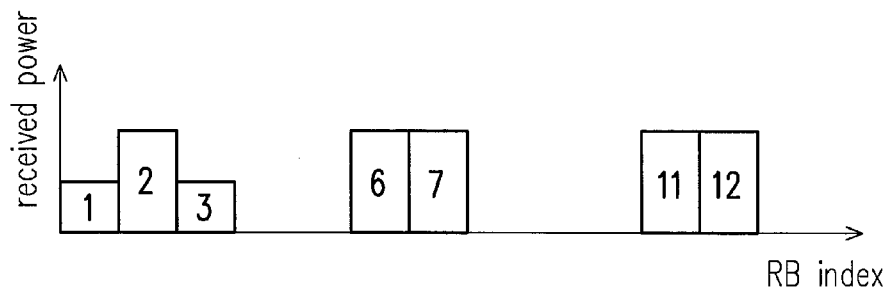
FIG. 8B illustrates a schematic diagram of a detection output after the receiver detecting the reference signal.

FIG. 8B illustrates a schematic diagram of a detection output after the receiver detects the reference signal. By detecting the reference signal RS, the communication unit 610 would be able to recognize that the RBs with physical index of [1 2 3 6 7 11 12] would be used for transmitting data. Next, by extracting the pre-offset PO from the reference signal RS, the processing unit 620 could rebuild the mapping table MT according to the pre-offset PO (step S702). Then, the processing unit 620 could de-maps the physical index PHY-IDX and the virtual index according to the detection output from the communication unit 610 (the un-sorted physical index PHY-IDX, as shown in FIG. 8B) and the mapping table MT (step S703)

Figure 8C:
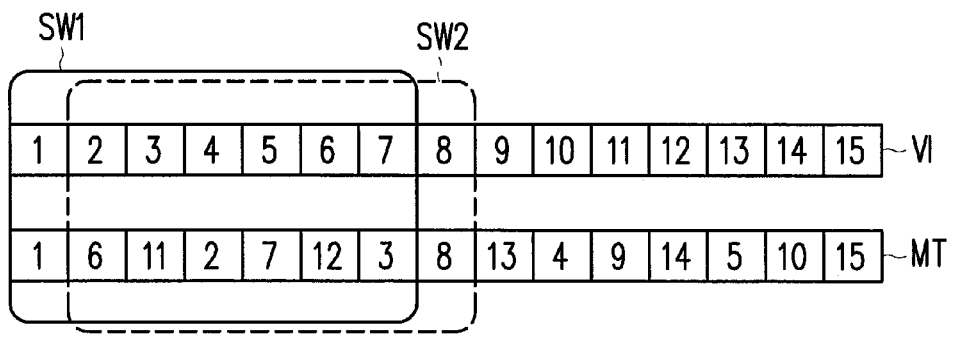
FIG. 8C illustrates the de-mapping process using the relationship between the virtual index and the physical index.

FIG. 8C illustrates the de-mapping process using the relationship between the virtual index and the physical index PHY-IDX. Referring to FIG. 8C, the upper row would represent the virtual index VI and the lower row would represent the mapping table MT. The de-mapping step (S703) would be executed by shifting a search window on the virtual index VI and the mapping table MT to fit in the detection output from the communication unit 610. In other words, the processing unit 620 would re-sort the physical index from the detection output and find out which consecutive part of the mapping table MT can be fitted in and find out the corresponding virtual index thereby. As a result, the processing unit 620 finds out that the physical index of the detection output can be fitted in search window SW1 and SW2. In search window SW1, the physical index is [1 6 11 2 7 12], corresponding to the virtual index [1 2 3 4 5 6]. By using the equation (4) (or (5)), the spreading code index could be calculated as [3 3 3 1 1 1]. Also, in search window SW2, the physical index is [6 11 2 7 12 3], which corresponds to the virtual index [2 3 4 5 6 7]. By using the equation (4), the spreading code index SC can be calculated as [2 3 3 3 1 1]. By recognizing the resource pattern RP including the physical index PHY-IDX and the spreading code index SC, the communication unit 610 could receive the uplink transmitting signal UL-SIG and transfer the uplink transmitting signal UL-SIG to the transmitting data bits TB according to the resource pattern RP.

Figure 9:
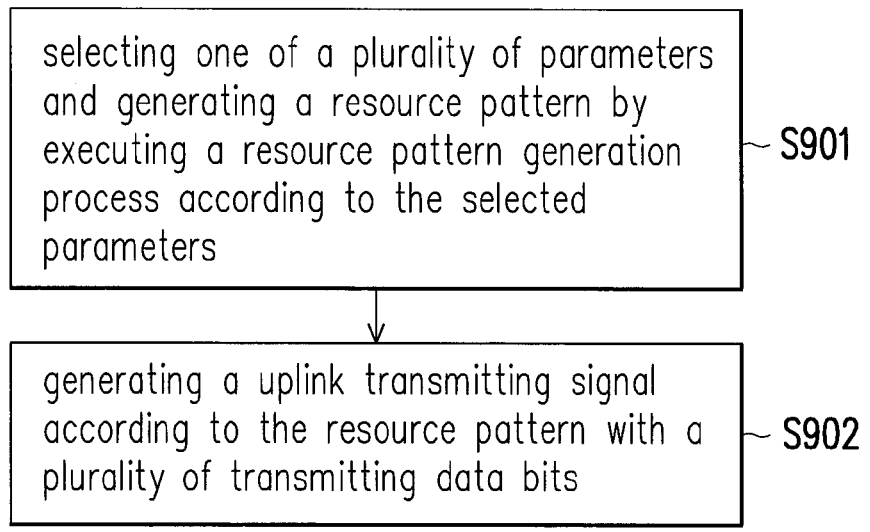
FIG. 9 illustrates a flow chart of the transmitting method according to an embodiment of the present disclosure.

The present disclosure also provides a transmitting method, adapted for a transmitter in an user equipment (UE) for a data transmission scheme using a contention-based radio access based on single-carrier frequency division multiplexing access with code division multiplexing (SC-FDMA-CDM). FIG. 9 illustrates a flow chart of the transmitting method according to an embodiment of the present disclosure. Referring to FIG. 9, first at step S901, one of a plurality of parameters would be selected and a resource pattern would be generated by executing a resource pattern generation process according to the selected parameters, wherein the resource pattern would include a physical index of a plurality of resource blocks and a spreading code index. Next, at step S902, an uplink transmitting signal would be generated according to the resource pattern with a plurality of transmitting data bits. And the detailed description of the transmitting method can refer to the above-mentioned embodiments described in FIG. 1~8C, which is omitted to describe herein.

Figure 10:
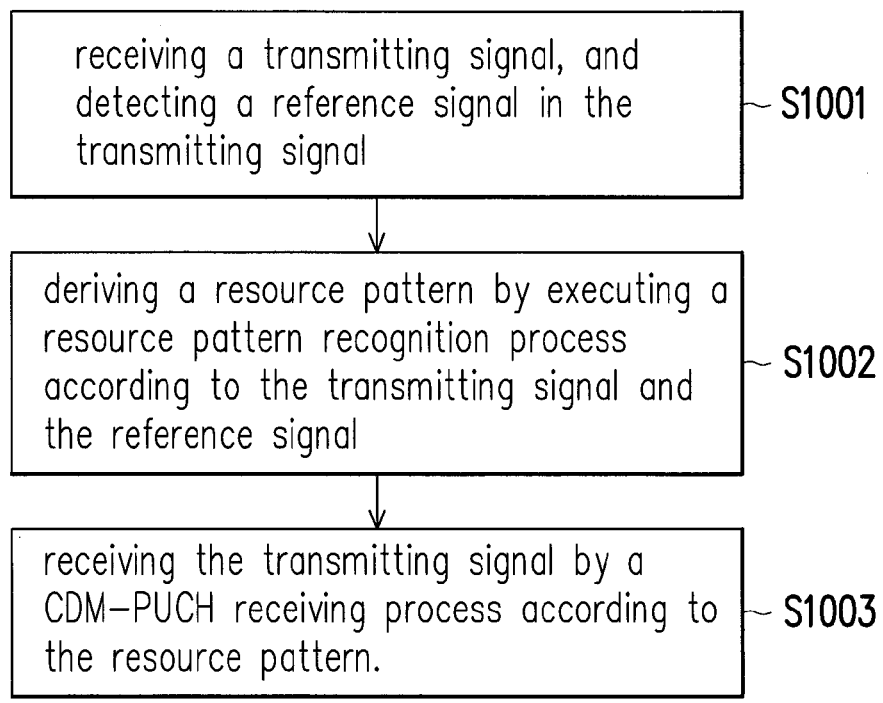
FIG. 10 illustrates a flow chart of the receiving method according to an embodiment of the present disclosure.

The disclosure also provides a receiving method, adapted for a receiver in a control node of a data transmission scheme using a contention-based radio access based on single-carrier frequency division multiplexing access with code division multiplexing (SC-FDMA-CDM). And FIG. 10 illustrates a flow chart of the receiving method according to an embodiment of the present disclosure. Referring to FIG. 10, First, at step S1001, a transmitting signal would be received, and a reference signal in the transmitting signal would be detected. Next, at step S1002, a resource pattern would be derived by executing a resource pattern recognition process according to the transmitting signal and the reference signal, wherein the resource pattern would include at least but not limited to a physical index of a plurality of resource blocks and a spreading code index. And then at step S1003, the transmitting signal would be received by a code division multiplexing physical uplink channel (CDM-PUCH) receiving process according to the resource pattern. And the detailed description of the receiving method can refer to the above-mentioned embodiments described in FIG. 1~FIG. 8C, which is omitted to describe herein.

In view of the aforementioned descriptions, the present disclosure provides a transmitter and a transmitting method thereof, jointly generates physical index of the resource blocks and the spreading code index (i.e., the resource pattern) based on a permutation function, which provides the randomness of allocation and reduces the collision probability thereby. Also, a conventional access procedure between the UE and a control node (e.g., sending random access preamble signal and receiving a contention resolution . . . etc.) could be omitted.

The present disclosure also provides a receiver and a receiving method thereof, which shrinks the wide search range when searching the resource patterns by the relationships between the physical index of the allocated resource blocks and the spreading code index. Since the receiving process provided by the disclosure involves only the recognition of resource pattern and the code-division multiplexing scheme, by this, the computation complexity of the receiver in the transmission scheme using a contention-based radio access can be greatly reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A transmitter, adapted for an user equipment (UE) of a data transmission scheme using a contention-based radio access based on single-carrier frequency division multiplexing access with code division multiplexing, comprising:
   a memory unit, storing a plurality of parameters;
   a processing unit, coupled to the memory unit, selecting one of the parameters and generating a resource pattern by executing a resource pattern generation process according to the selected parameter, wherein the resource pattern includes a physical index of a plurality of resource blocks and a spreading code index, and the processing unit generates a reference signal comprising a pre-offset,
      wherein the resource pattern generation process comprises:
         a pre-permutation offset decision step, selecting the pre-offset from the parameters stored in the memory unit, and generating the physical index and the spreading code index according to the pre-offset; and a communication unit, coupled to the processing unit, generating and transmitting an uplink transmitting signal according to the resource pattern with a plurality of transmitting data bits, so as to transmit the transmitting data bits through the uplink transmitting signal.

2. The transmitter according to claim 1, wherein:
a random access preamble signal is not transmitted before the transmission of uplink transmitting signal.

3. The transmitter according to claim 1, wherein the resource pattern generation process comprising:
a pre-permutation shifting step, cyclic shifting a ordered index according to the pre-offset, wherein the ordered index comprises a sequence of continuous numbers in an ascending order or in a descending order;
a permutation step, permuting the ordered index into a mapping table;
a mapping step, mapping an virtual index onto the mapping table to generate the physical index of the resource blocks; and
a code decision step, generating the spreading code index according to the physical index.

4. The transmitter according to claim 3 wherein:
after the mapping step, the resource pattern generation process further comprising:
a post-permutation offset decision step, selecting a post-offset from the parameters stored in the memory unit; and
a post-permutation shifting step, cyclic shifting a position of the virtual index onto the mapping table according to the post-offset to generate the physical index,
wherein, further in the code decision step, generating the spreading code index according to the shifted physical index, the pre-offset and a spreading factor.

5. The transmitter according to claim 1, wherein the communication unit comprising:
a media access control (MAC) protocol unit, coupled to the processing unit, allocating the transmitting data bits according to the physical index of the resource blocks; and
a code division multiplexing physical uplink channel, coupled to the MAC protocol unit and the processing unit, receiving the allocated transmitting data bits from the MAC protocol control unit, generating the uplink transmitting signal according to the physical index of the resource blocks, the spreading code index and the allocated transmitting data bits, and appending the reference signal in the uplink transmitting signal.

6. The transmitter according to claim 1, wherein a code division multiplexing physical uplink channel comprising a CDM-PUCH processing, and the CDM-PUCH processing comprising:
a channel encoding process, encoding the allocated transmitting data bits ATS into a plurality of coded allocated transmitting data bits;
a scrambling step, scrambling the coded allocated transmitting data bits into a plurality of scramble transmitting data bits;
a modulating step, modulating the scrambling transmitting data bits into a plurality of modulated complex symbols;
a discrete Fourier transform (DFT) spreading step, transforming and spreading the modulated complex symbols to frequency domain with a discrete Fourier transformation to generate a plurality of DFT output;
a CDM spreading step, generating a plurality of spreading outputs by spreading the DFT outputs according to the spreading code index; and a sub-carrier mapping step, mapping the spreading output with a plurality of sub-carriers according to the physical index of the resource blocks;
a inverse discrete Fourier transform (IDFT) step, transforming the sub-carrier mapped CDM spreading output with a inverse discrete Fourier transformation to generate the uplink transmitting signal; and
a cyclic prefix insertion step, replicating the last samples of IDFT output symbols as a cyclic prefix and inserting the cyclic prefix at the front of the uplink transmitting signal.

7. A transmitting method, adapted for a transmitter in an user equipment (UE) for a data transmission scheme using a contention-based radio access based on single-carrier frequency division multiplexing access with code division multiplexing, comprising:
selecting one of a plurality of parameters and generating a resource pattern by executing a resource pattern generation process according to the selected parameters, and generating a reference signal comprising a pre-offset, wherein the resource pattern includes a physical index of a plurality of resource blocks and a spreading code index, wherein the resource pattern generation process comprises:
a pre-permutation offset decision step, selecting the pre-offset from the parameters stored in a memory unit, and generating the physical index and the spreading code index according to the pre-offset; and
generating and transmitting an uplink transmitting signal according to the resource pattern with a plurality of transmitting data bits, so as to transmit the transmitting data bits through the uplink transmitting signal.

8. The transmission method according to claim 7, wherein before the step of generating and transmitting the uplink transmitting signal, the transmission method further comprising:
a random access preamble signal is not transmitted.

9. The transmission method according to claim 7, wherein the resource pattern generation process comprising:
a pre-permutation shifting step, cyclic shifting the ordered index according to the pre-offset;
a permutation step, permuting an ordered index into a mapping table;
a mapping step, mapping an virtual index onto the mapping table to generate the physical index of the resource blocks; and
a code decision step, generating the spreading code index according to the physical index.

10. The transmission method according to claim 9, after the mapping step, the resource pattern generation process further comprising:
a post-permutation offset decision step, selecting a post-offset from the parameters; and
a post-permutation shifting step, cyclic shifting a position of the virtual index onto the mapping table according to the post-offset to generate the physical index,
wherein, further in the code decision step, generating the spreading code index according to the shifted physical index, the pre-offset and a spreading factor.

11. The transmission method according to claim 9, wherein the step of generating a uplink transmitting signal according to the resource pattern with the transmitting data bits comprising:
allocating the transmitting data bits according to the physical index of the resource blocks;
generating the uplink transmitting signal by executing a CDM-PUCH processing according to the physical index of the resource blocks, the spreading code index and the allocated transmitting data bits; and appending the reference signal in the uplink transmitting signal.

12. The transmission method according to claim 11, wherein the CDM-PUCH processing comprising:
   a channel encoding process, encoding the allocated transmitting data bits ATS into a plurality of coded allocated transmitting data bits;
   a scrambling step, scrambling the coded allocated transmitting data bits into a plurality of scramble transmitting data bits;
   a modulating step, modulating the scrambling transmitting data bits into a plurality of modulated complex symbols;
   a discrete Fourier transform (DFT) spreading step, transforming and spreading the modulated complex symbols to frequency domain with a discrete Fourier transformation to generate a plurality of DFT output;
   a CDM spreading step, generating a plurality of spreading output by spreading the subcarrier-mapped DFT output according to the spreading code index;
   a sub-carrier mapping step, mapping the spreading output with a plurality of sub-carriers according to the physical index of the resource blocks;
   a inverse discrete Fourier transform (IDFT) step, transforming the spreading output with a inverse discrete Fourier transformation to generate the uplink transmitting signal; and
   a cyclic prefix insertion step, replicating the last samples of IDFT output symbols as a cyclic prefix and inserting the cyclic prefix at the front of the uplink transmitting signal.

13. A receiver, adapted for a control node of a data transmission scheme using a contention-based radio access based on single-carrier frequency division multiplexing access with code division multiplexing, comprising:
   a communication unit, receiving a transmitting signal, and detecting a reference signal in the transmitting signal;
   a processing unit, coupled to the communication unit, deriving a resource pattern by executing a resource pattern recognition process according to the transmitting signal and the reference signal, wherein the resource pattern comprising a physical index of a plurality of resource blocks and a spreading code index,
   wherein the communication unit receives the resource pattern from the processing unit, the communication unit further receives the transmitting signal by a code division multiplexing physical uplink channel receiving process according to the resource pattern to transfer the transmitting signal into a plurality of transmitting data bits,
   wherein the resource pattern recognition process comprising:
   a reference signal detection step, extracting a pre-offset from the reference signal, and determining a physical index of the resource blocks;
   a resource mapping step, generating a mapping table according to the pre-offset and the physical index; and
   a physical/virtual index de-mapping step, de-mapping the physical index into a virtual index according to the mapping table, and determining the resource pattern according to the mapping table and the virtual index.

14. The receiver according to claim 13, wherein:
   the communication unit merely transfers the transmitting signal into the transmitting data bits according to the resource pattern derived by resource pattern recognition process and a code division multiplexing scheme without any additional information.

15. The receiver according to claim 13, wherein:
   the communication unit transmits an acknowledge (ACK) signal or a negative acknowledge (NACK) signal according to a receiving result of the CDM-PUCH receiving process.

16. A receiving method, adapted for a receiver in a control node of a data transmission scheme using a contention-based radio access based on single-carrier frequency division multiplexing access with code division multiplexing (SC-FDMA-CDM), comprising:
   receiving a transmitting signal, and detecting a reference signal in the transmitting signal;
   deriving a resource pattern by executing a resource pattern recognition process according to the transmitting signal and the reference signal, wherein the resource pattern comprising a physical index of a plurality of resource blocks and a spreading code index; and
   receiving the transmitting signal by a code division multiplexing physical uplink channel (CDM-PUCH) receiving process according to the resource pattern and transferring the transmitting signal into a plurality of transmitting data bits,
   wherein the resource pattern recognition process comprising:
   a reference signal detection step, extracting a pre-offset from the reference signal, and determining a physical index of the resource blocks;
   a resource mapping step, generating a mapping table according to the pre-offset and the physical index; and
   a physical/virtual index de-mapping step, de-mapping the physical index into a virtual index according to the mapping table, and determining the resource pattern according to the mapping table and the virtual index.

17. The receiving method of 16, wherein at the step of transferring the transmitting signal into the transmitting data bits, the receiving method comprising:
   transferring the transmitting signal into the transmitting data bits according to the resource pattern derived by resource pattern recognition process and a code division multiplexing scheme without any additional information.

18. The receiving method according to claim 16, wherein after the step of receiving the transmitting signal by the CDM-PUCH receiving process, the method further comprising:
   transmitting an acknowledge (ACK) signal or a negative acknowledge (NACK) signal according to a receiving result of the CDM-PUCH receiving process.

* * * * *